Figure 1:
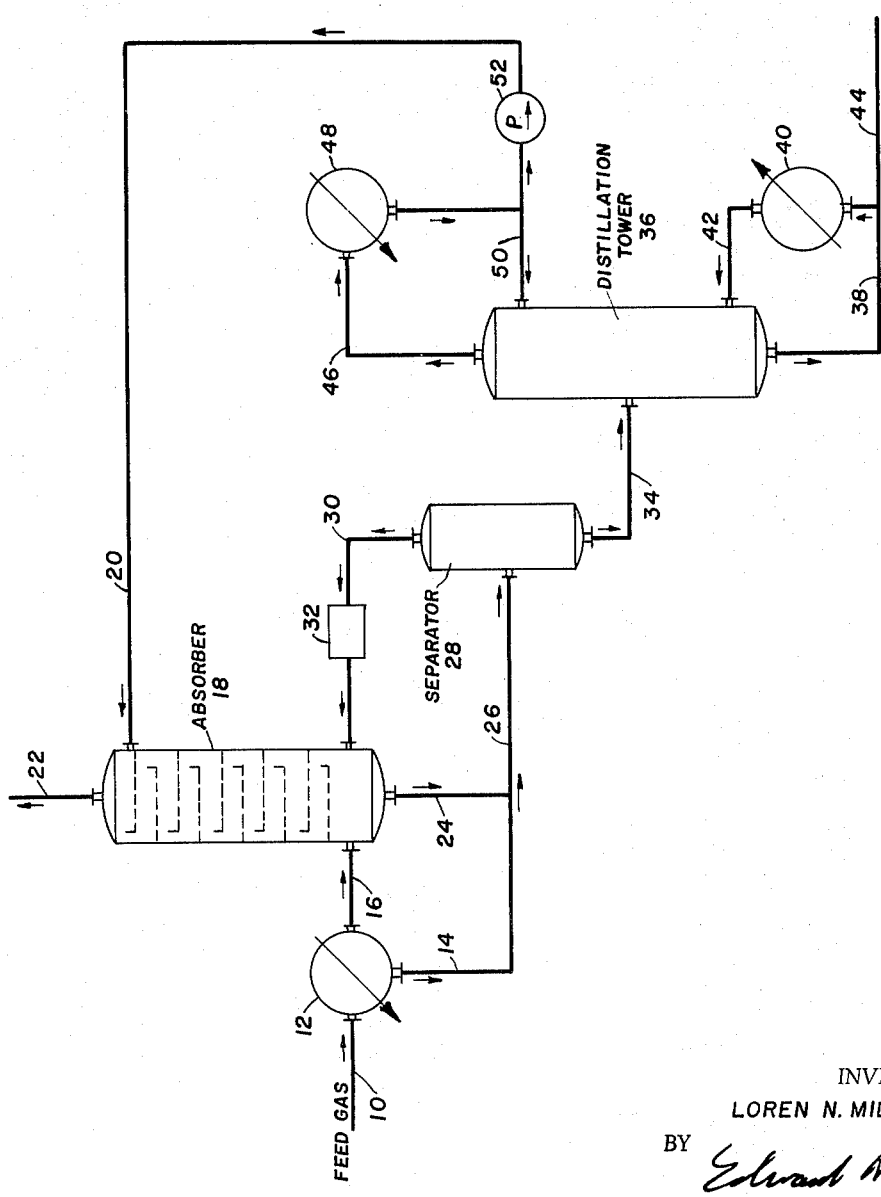

INVENTOR.
LOREN N. MILLER
BY Edward W Lang
ATTORNEY.

United States Patent Office 3,247,649
Patented Apr. 26, 1966

3,247,649
ABSORPTION PROCESS FOR SEPARATING COMPONENTS OF GASEOUS MIXTURES
Loren N. Miller, Crystal Lake, Ill., assignor, by mesne assignments, to Union Oil Company of California, Los Angeles, Calif., a corporation of California
Filed Apr. 29, 1963, Ser. No. 276,278
8 Claims. (Cl. 55—40)

This invention relates to the separation of gaseous mixtures and, more particularly, to a process for separating liquefiable hydrocarbons from a gaseous mixture containing same and carbon dioxide and ethane. The process of this invention is especially useful for separating liquefiable hydrocarbons from a natural gas containing a significant total amount of carbon dioxide and ethane.

Propane and higher molecular weight hydrocarbons are conventionally recovered from natural gas by refrigeration and/or by absorption with a relatively high-molecular-weight absorber oil. While conventional processes for separating liquefiable hydrocarbons from natural gas are satisfactory where only part of the liquefiable hydrocarbons is to be removed from the natural gas, or where the total concentration of carbon dioxide and ethane in the natural gas is relatively low, they are not satisfactory where these conditions do not exist. In order to absorb substantially the entire liquefiable hydrocarbon content of a natural gas containing over about 15 volume percent of carbon dioxide and ethane, it is necessary to coabsorb at least one half of the carbon dioxide and ethane along with the liquefiable hydrocarbon fraction. For example, in order to absorb most of the liquefiable hydrocarbon content of a natural gas containing two gallons per MCF (1,000 cubic feet) of $C_{3+}$ hydrocarbons and six gallons per MCF of carbon dioxide and ethane by means of a conventional low-temperature absorption process, it would be necessary to absorb about four gallons per MCF of unwanted carbon dioxide and ethane, thus requiring uneconomical refrigeration and liquid loading.

In addition, several serious problems which greatly reduce the efficiency of conventional processes are encountered when the total carbon dioxide and ethane content of the natural gas exceed the liquefiable hydrocarbon content by a factor of two or more. These problems include: the heat of absorption in the absorber becomes excessive, thereby necessitating column intercooling or refrigeration of the absorption oil to very low temperatures; the costly removal of large amounts of extraneous carbon dioxide and ethane; and the reverse temperature-profile, caused by the low ratio between the total heat capacity of the gas and the total heat capacity of the absorbent liquid, interferes with subsequent low-temperature separation steps, such as carbon dioxide removal from the gas. Also, the normal temperature distribution within the absorber is reversed with a "pinch point" (i.e., a place where the operating line on a liquid-gas concentration diagram approaches closely to the equilibrium line interfering with the degree to which LPG can be removed) occurring in the upper portion of the absorber which greatly reduces the absorption efficiency.

In accordance with this invention, I have discovered a superior process for recovering liquefiable hydrocarbons from natural gases which contain high total concentrations of carbon dioxide and ethane. The liquefiable hydrocarbons recovered from the process of this invention are low-molecular-weight hydrocarbons, such as propane, butanes, pentanes or mixtures thereof. A typical liquefiable hydrocarbon product is a mixture of these hydrocarbons known commercially as liquefied petroleum gas, which is referred to as LPG. These mixtures consist of hydrocarbons containing 2–6 carbon atoms per molecule, principally propane and butanes with minor proportions of ethane and pentanes, and possibly very minor proportions of methane, and hexane and heavier hydrocarbons. Briefly, my process is based on scrubbing and chilling the natural gas by counter-current contact with a recycled liquid stream consisting essentially of carbon dioxide, ethane, and other light hydrocarbons.

Figure 2:
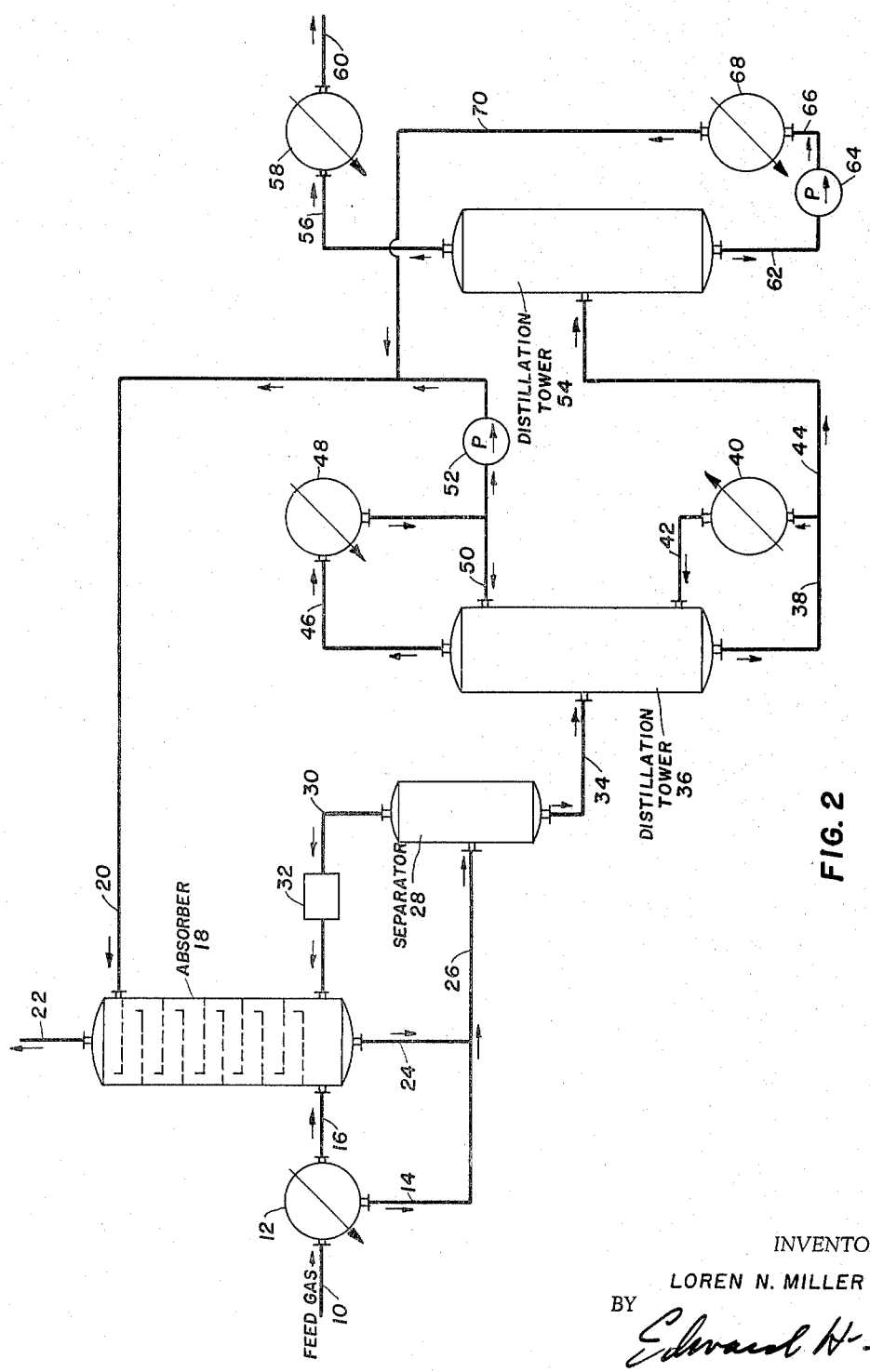

It is, therefore, a primary object of this invention to provide a process for removing liquefiable hydrocarbons from gaseous mixtures. Another object of this invention is to provide a process for removing liquefiable hydrocarbons from admixtures with carbon dioxide and ethane. Still another object of this invention is to provide a process for separating liquefiable hydrocarbons from a natural gas containing a significant total concentration of carbon dioxide and ethane. A further object of this invention is to provide a process for removing liquefiable hydrocarbons from natural gas containing a significant total concentration of carbon dioxide and ethane, by absorption in a recycled liquid stream consisting essentially of carbon dioxide and ethane and other light hydrocarbons. These and further objects of this invention will become apparent as the description herein proceeds and reference is made to the accompanying drawings in which:

FIGURE 1 illustrates in diagrammatic form an arrangement of apparatus suitable for carrying out the process of this invention; and FIGURE 2 illustrates in diagrammatic form an alternate arrangement of apparatus suitable for carrying out the process of this invention.

In carrying out the process of this invention, a feed stream comprising a gaseous mixture of carbon dioxide, ethane and liquefiable hydrocarbons (e.g., propane and butanes), such as a natural gas, is introduced at superatmospheric pressure into a cooling zone to effect the cooling and partial condensation of the feed gas. The feed stream may also contain other hydrocarbon and non-hydrocarbon constituents, such as $CH_4$, $C_5H_{12}$, $C_6H_{14}$, $H_2S$, $N_2$, etc. If the feed gas is not under a sufficient pressure, depending on its source, it may be first compressed to superatmospheric pressure before it is introduced into the cooling zone. In general the feed stream introduced into the cooling zone will be under pressures varying from about 100–1500 p.s.i.g. (pounds per square inch gauge), although lower and higher pressures may be used. Preferably, the gas is introduced into the cooling zone at about 200–1000 p.s.i.g. The temperature to which the high pressure feed stream is cooled to achieve the desired effects in the process to be described will naturally depend upon its pressure, but in general will be about $-100°$ to $+50°$ F. For example, a gas at 200–1000 p.s.i.g. pipeline pressure is cooled to a temperature within the range of about $-20°$ to $+20°$ F.

In the cooling zone, the condensate comprising the major portion of the normally liquid hydrocarbon ($C_{5+}$ hydrocarbons) content of the feed gas and some of the carbon dioxide and liquefiable hydrocarbon ($C_3$ and $C_4$ hydrocarbons) content of the feed gas is separated from the remaining high pressure gas, and the latter is introduced directly into an absorption zone. The high pressure gas stream is counter-currently contacted in the absorption zone with a recycled adsorbent mixture of liquid carbon dioxide and ethane, under conditions resulting in the partial vaporization of the absorbent to achieve autorefrigeration and absorption of the liquefiable hydrocarbons in the unvaporized absorbent. The absorption zone is preferably operated at a pressure of about 400 to 800 p.s.i.g. and a temperature of about −44° to 0° F. In general, the feed gas and the absorbent are preferably contacted at a rate of 1 to 4 gallons of absorbent per M.c.f of gas. Separately withdrawn from the absorbtion zone are an overhead gaseous stream consisting essentially of the gaseous constituents of the feed stream, to be treated as desired, and a rich absorbent liquid stream. The gaseous mixture leaving the absorbent zone may be subsequently further cooled for removal of carbon dioxide, or be used in indirect heat exchange with the inlet gas stream to cool same.

The rich absorbent, which may be combined with the condensate from the cooling zone, if so desired, is introduced into a distillation tower where the carbon dioxide, ethane, and other light hydrocarbons are separated therefrom as distillation overhead to obtain substantially pure liquefiable hydrocarbons as a distillation bottom product. Finally, the distillation overhead is compressed, condensed, and returned to the absorption zone as the aforementioned recycle absorbent stream.

It will be evident that contrary to conventional processes, in my process carbon dioxide, ethane and other light hydrocarbons are desirable in the absorber effluent liquid, since they are later separated and used as the absorption medium. The partial vaporization of the absorbent mixture comprising carbon dioxide, ethane, etc., provides a counterbalance to the heat of absorption of the propane and higher molecular weight hydrocarbon constituents further down the column and uniformly high driving forces for the condensation of the propane and heavier hydrocarbons.

By regulating the countercurrent scrubbing conditions, the amount of carbon dioxide, ethane, etc., absorbed can be limited to the amount needed for scrubbing, about two gallons per M.c.f. The nature of the scrubbing action achieved in my process results in a normal temperature-profile in the absorber, without a "pinch" between equilibrium and operating conditions. Thus, complete recovery of propane and heavier constituents can be achieved without absorbing excessive amounts of carbon dioxide and ethane.

Should less than enough carbon dioxide and ethane remain in the liquid at the bottom of the absorber to provide sufficient recycle material for cooling and reflux in the tower, additional ethane and carbon dioxide may be provided from the condensate removed from the high pressure gas stream.

The process of this invention is best suited for use with gases containing carbon dioxide and ethane in a total amount which is at least twice the volume percent of the propane and higher molecular weight hydrocarbon constituents. When this ideal ratio is lower, resulting in the unavailability of sufficient recycle material, the chilling auto-refrigeration, provided by the recycle, is supplemented by low temperature refrigeration and/or the carbon dioxide-ethane absorbent mixture may be supplemented with conventional absorber oil.

The present invention will be more clearly understood by reference to FIGURE 1 which is a schematic flow diagram of the process of this invention. The process indicated in the drawing will be described in detail including operating pressure, temperatures, flow rates, and fluid compositions by way of a specific example of the instant invention. Referring now to FIGURE 1, the feed gas to the process, comprising a natural gas at 800 p.s.i.g. pipeline pressure and a temperature of 80° F., is fed at a rate of 50,000 M.c.f. (1000 cubic feet per day) through line 10 into heat exchanger 12. The feed gas has the following composition:

TABLE I

*Feed gas composition*

| Components: | Mol percent |
|---|---|
| Carbon dioxide | 17.4 |
| Nitrogen | 13.1 |
| Methane | 46.3 |
| Ethane | 8.5 |
| Propane | 3.0 |
| Butanes | 1.3 |
| Pentanes & heavier | 0.4 |
| | 100.0 |

In heat exchanger 12 the feed gas is cooled to 0° F. to obtain a condensate of the composition:

TABLE II

*Condensate composition*

| Components: | Mol percent |
|---|---|
| Carbon dioxide | 27.4 |
| Nitrogen | 2.0 |
| Methane | 20.0 |
| Ethane | 16.2 |
| Propane | 15.7 |
| Butanes | 12.7 |
| Pentanes & heavier | 6.0 |
| | 100.0 |

The condensate is withdrawn from heat exchanger 12 through line 14 at a rate of 35 gallons/minute. Then the uncondensed constituents of the feed gas of the composition:

TABLE III

*Absorber feed composition*

| Components: | Mol percent |
|---|---|
| Carbon dioxide | 27.4 |
| Nitrogen | 13.6 |
| Methane | 47.8 |
| Ethane | 8.1 |
| Propane | 2.3 |
| Butanes | 0.7 |
| Pentanes & heavier | 0.1 |
| | 100.0 | and at a pressure of 795 p.s.i.g. is passed from heat exchanger 12 through line 16 into the bottom of absorber 18 at a rate of 47,600 MCF/D.

In absorber 18 the feed gas is contacted with a lean absorbent mixture of the composition:

TABLE IV

*Lean absorbent composition*

| Components: | Mol percent |
|---|---|
| Carbon Dioxide | 46.0 |
| Nitrogen | 0.3 |
| Methane | 18.5 |
| Ethane | 35.2 |
| Propane | --- |
| Butanes | --- |
| Pentanes & Heavier | --- |
| | 100.0 | which is introduced into the top of absorber 18 through line 20 at a temperature of −60° F. and a rate of 65 gallons/minute or 2 gallons/MCF of absorber feed gas. Absorber 18 can be any suitable absorption column, such as a vertically extended column containing appropriate packing or trays to assure intimate countercurrent contact of the rising feed mixture with the downflowing absorbent, as illustrated in the drawing. In absorber 18, which is at about −30° F. and 790 p.s.i.g., the absorbent mixture is partially vaporized, thereby achieving autorefrigeration, and a substantial portion of the liquefiable hydrocarbons, as well as some carbon dioxide and ethane, is absorbed in the unvaporized absorbent. The product off gas of the composition:

TABLE V

*Off gas composition*

| Components: | Mol percent |
|---|---|
| Carbon Dioxide | 28.6 |
| Nitrogen | 13.7 |
| Methane | 48.5 |
| Ethane | 8.9 |
| Propane | 0.3 |
| Butanes | trace |
| Pentanes & Heavier | --- |
| | 100.0 | is removed from absorber through line 22. The rich absorbent is withdrawn from absorber 18 through line 24.

If desired, the rich absorbent in line 24 may then be combined with the condensate in line 14, as illustrated, to provide ethane and carbon dioxide from the condensate should there be an insufficient amount of carbon dioxide and ethane in the rich absorbent to provide sufficient recycle material for cooling and reflux in absorber 18. The combined liquid in line 26 is then introduced into separator 28. Gases separated from the liquid mixture in separator 28 are removed therefrom through line 30, after which they are compressed in compression unit 32 and introduced into the bottom of absorber 18. The liquid mixture of the rich absorbent and condensate is removed from separator 28 through line 34.

The liquid in line 34 having the composition:

TABLE VI

*Distillation tower feed composition*

| Components: | Mol percent |
|---|---|
| Carbon Dioxide | 32.3 |
| Nitrogen | 0.2 |
| Methane | 13.0 |
| Ethane | 24.7 |
| Propane | 18.2 |
| Butanes | 8.8 |
| Pentanes & Heavier | 2.7 |
| | 100.0 | is then introduced into distillation tower 36. Temperature and pressure conditions in distillation tower 36 are adjusted to substantially free the rich absorbent of dissolved hydrocarbon content by vaporization of the absorbent comprising carbon dioxide, ethane, and other light hydrocarbons. In this example, distillation tower 36 is operated at −60° F. to +60° F. and 300 p.s.i.g. A liquid product having the following composition:

TABLE VII

*Light product hydrocarbon*

| Components: | Mol percent |
|---|---|
| Carbon Dioxide | 0.0 |
| Nitrogen | 0.0 |
| Methane | 0.0 |
| Ethane | trace |
| Propane | 61.3 |
| Butanes | 29.6 |
| Pentanes & Heavier | 9.1 |
| | 100.0 | is withdrawn from tower 36 through line 38 and a portion is returned to the distillation tower 36 through heater 40 and line 42, while the balance is removed from the system through line 44 for storage or other disposition. The overhead from distillation tower 36, comprising the vaporized absorbent, is withdrawn through line 46 and condensed in cooler 48, and a portion thereof is returned as reflux to distillation tower 36 through line 50, while the balance is recycled to absorber 18 through line 20 by way of pump 52.

Should the feed gas contain too low a ratio of carbon dioxide and ethane to propane and heavier hydrocarbons to provide sufficient recycle material, i.e., less than 2:1, the autorefrigeration provided by the recycle may be supplemented by providing low temperature refrigeration in the absorber and/or combining the recycle mixture with up to about 50 volume percent of conventional absorber oil. It will be obvious that additional carbon dioxide and/or ethane can be added to the feed mixture so that it contains at least twice as much carbon dioxide and ethane as liquefiable hydrocarbons. Referring to FIGURE 2, if the absorbent mixture in the process described in relation to FIGURE 1 were supplemented with conventional absorber oil, the liquefiable hydrocarbons in line 44 would be in admixture with the absorber oil. Then the liquid in line 44 would be introduced into second distillation tower 54 maintained under such temperature and pressure conditions to substantially separate the hydrocarbons from the absorber oil. For example, temperatures within the range of about 60°–350° F. and pressures within the range of about 50–350 p.s.i.g. may be used. The hydrocarbon constituents separated from the absorber oil are withdrawn from distillation zone 54 through line 56, condensed in cooling zone 58, and removed through line 60 for suitable disposition. The absorption oil is withdrawn from the bottom of distillation zone 54 through line 62 and pumped by pump 64 through line 66 into cooling zone 68. In cooling zone 68 the absorber oil is cooled to substantially the temperature of the absorbent mixture in line 20 and is passed through line 70 and combined with the absorbent mixture in line 20.

The embodiments of this invention in which an exclusive property or privilege is claimed are defined as follows:

1. A process for separating liquefiable hydrocarbons from a gaseous mixture containing carbon dioxide, ethane and higher molecular weight hydrocarbons which comprises
   (a) contacting said gaseous mixture in an absorption zone with a liquid absorbent consisting essentially of carbon dioxide, ethane and methane, under conditions to partially vaporize said absorbent and to absorb hydrocarbons of higher molecular weight than ethane in unvaporized absorbent thereby forming a rich absorbent;
   (b) separately withdrawing from said absorption zone gaseous and rich absorbent streams;
   (c) separating hydrocarbons of higher molecular weight than ethane from said rich absorbent under conditions to at least partially vaporize carbon dioxide, methane and ethane;
   (d) condensing the vaporized carbon dioxide, methane and ethane from step (c) to form a liquid lean absorbent; and
   (e) recycling at least a portion of said lean absorbent to said absorption zone.

2. A process in accordance with claim 1 which includes introducing said gaseous mixture, at superatmospheric pressure, into a cooling zone, said pressure and a temperature therein being sufficient to effect at least partial condensation of a portion of the higher molecular weight constituents thereof and withdrawing a condensate from said cooling zone, before said gaseous mixture is contacted with said absorbent liquid.

3. A process in accordance with claim 2 which includes combining said withdrawn condensate with said rich absorbent from step (b) prior to step (c).

4. A process in accordance with claim 3 in which said gaseous mixture is at a pressure within the range of about 200–1000 p.s.i.g., is cooled to a temperature within the range of about −20° to +20° F. in said cooling zone.

5. A process in accordance with claim 4 which includes separating gases from the mixture of said condensate and rich absorbent liquids to provide carbon dioxide and ethane prior to step (c), compressing said gases, and recycling said gases to said absorption zone.

6. A process in accordance with claim 5 which includes separating said hydrocarbons of higher molecular weight than ethane from said rich absorbent in a distillation zone and forming a lean absorbent.

7. A process in accordance with claim 6 in which a portion of said liquid lean absorbent is recycled as reflux to said distillation zone.

8. A process in accordance with claim 7 in which the mol ratio of carbon dioxide and ethane to the other hydrocarbons of higher molecular weight than ethane, of said gaseous mixture, is at least 2:1.

References Cited by the Examiner

UNITED STATES PATENTS

| | | | |
|---|---|---|---|
| 2,250,949 | 7/1941 | Gerlach | 62—17 X |
| 2,318,752 | 5/1943 | Carney | 55—88 |
| 2,668,139 | 2/1954 | Baird et al. | 208—341 |
| 2,804,488 | 8/1957 | Cobb et al. | 55—51 |
| 2,857,018 | 10/1958 | Partridge et al. | 55—51 |
| 3,062,015 | 11/1962 | Cost | 62—17 |
| 3,075,918 | 1/1963 | Holm | 55—68 |
| 3,132,011 | 5/1964 | Kimble et al. | 55—46 |

REUBEN FRIEDMAN *Primary Examiner.*